N. B. White,
Wringer,
No. 2,287, Reissued June 12, 1866.
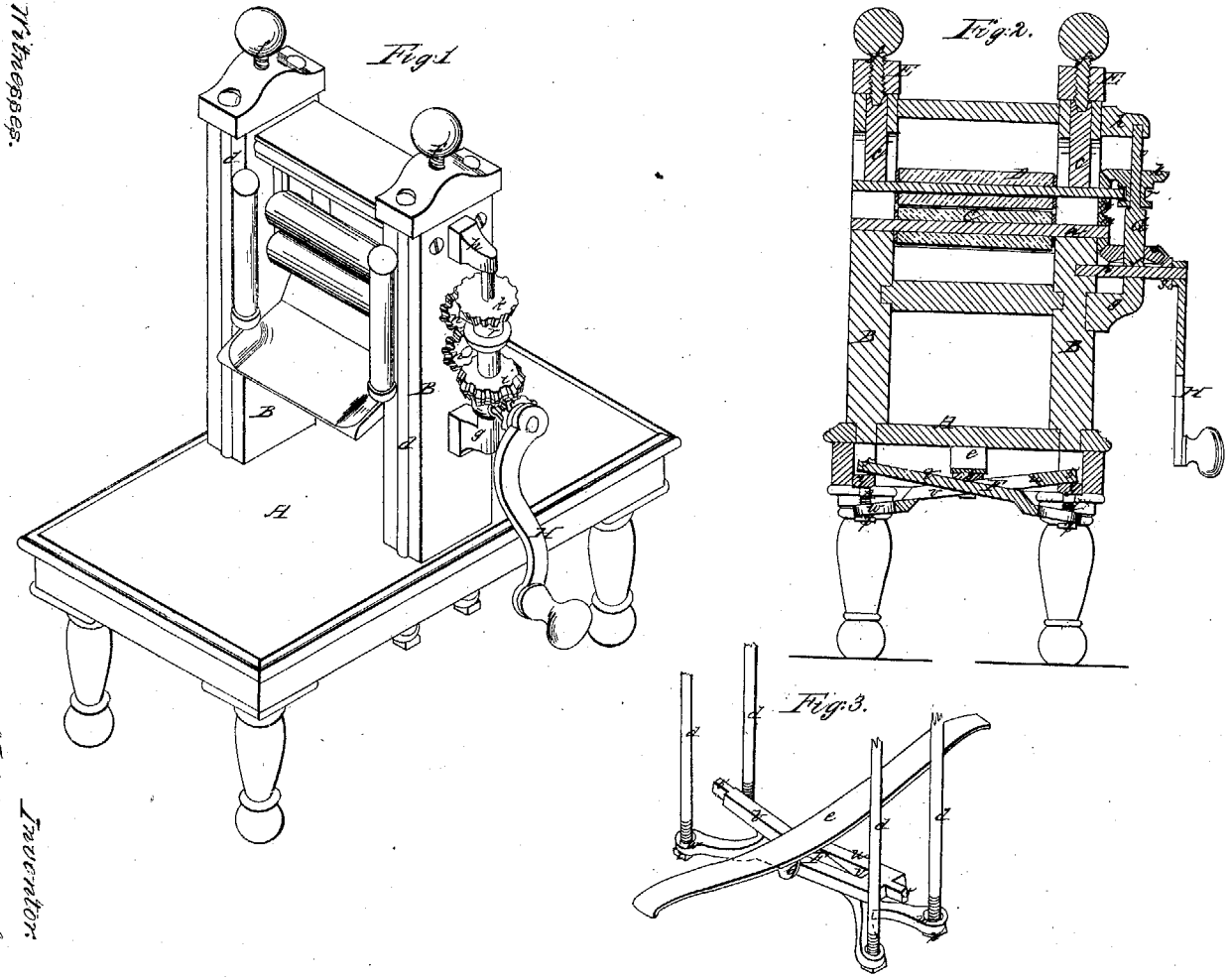
Witnesses.
W. E. Schumacher
Edmund Mason
Inventor.
Nelson B. White
by his attorney
Samuel C. Fraser
Jr. Rouse
N. PETERS, PHOTO-LITHOGRAPHER, WASHINGTON, D. C.

UNITED STATES PATENT OFFICE.

WM. B. RHOADS, OF SOUTH DEDHAM, MASSACHUSETTS, ASSIGNEE, BY MESNE ASSIGNMENT, OF NELSON B. WHITE.

IMPROVED CLOTHES-WRINGER.

Specification forming part of Letters Patent No. 34,618, dated March 4, 1862; Reissue No. 2,287, dated June 12, 1866.

*To all whom it may concern:*

Be it known that NELSON B. WHITE, of South Dedham, in the county of Norfolk and State of Massachusetts, invented certain Improvements in Clothes-Wringing Machines, of which the following is a full, clear, and exact description, reference being had to the accompanying drawings, making a part of this specification, in which—

Figure 1 is a perspective view of a wringing-machine; Fig. 2, a vertical section through the same; Fig. 3, detail to be referred to.

The first part of the present invention consists in an improved method of operating or revolving the rolls of a clothes-wringing machine.

I am aware that the two rolls have been connected together by gears, so that as one was revolved by the hand-crank motion was communicated to the other; but with such an arrangement the distance to which the rolls could separate one from the other was limited by the length of teeth of the gears, and of course would be but small. With my construction of the machine, however, a large amount of vertical motion may be allowed to one of the rolls without the rolls getting out of gear.

That others skilled in the art may understand and use the invention, I will proceed to describe it.

In the said drawings, A is a table intended to be of a convenient height and size to hold the tub or tubs. From this table rise two standards, B, in suitable bearings in which run the shaft *a* of the lower roll, C, and the shaft *b* of the upper roll, D, the latter shaft bearing against boxes *c*, which are free to rise and fall in recesses in the standards.

A head-block, E, on top of each standard B is connected by rods *d*, one on each side of the standard, with a frame, F, beneath the table. A stout metal spring, *e*, which extends lengthwise under the table, presses upon this frame F, (to be more particularly described hereinafter,) and through the rods *d* presses down the blocks E. A set-screw, *f*, passes through each block E and bears on the box *c*, so that the pressure of the spring *e* on the rolls D may be adjusted.

To the outside of one of the standards B is attached a bracket, *g*, and higher up another one, *h*. These support a vertical spindle, G, to which is attached a beveled gear, *i*. It also carries another gear, *k*, which is free to slide up and down on the spindle, but is carried round with it by means of a tongue which enters a slot, *o*, in the spindle.

A gear, *m*, on the shaft *a* engages with the gear *i*, and a gear, *n*, on the shaft *b* with the gear *k*. The latter shaft is prolonged and enters a groove, *r*, in the hub of the gear *k*. This permits the gear *k* to be carried up with the roll D as it rises. At the same time it continues engaged with the gear *n*, and the power applied to the lower gear, *i*, revolves both rolls with an equal speed, no matter at what distance they may be pressed apart by the article passing between them.

A horizontal shaft, *p*, which passes through the head of the bracket *g* and enters the side of the standard, carries at its outer end a beveled pinion, *s*, which engages with the gear *i*, (which, it will be seen, is beveled on both sides.) The hand-crank H is attached to this pinion *s*, and by it the gear *i* and spindle G are revolved. In this manner the required vertical motion may be allowed to the roll D, and the roll still be driven with the same surface motion as the lower roll, which is a great desideratum, and prevents, in a great measure, the rubber covering of the roll from being twisted from the shaft.

It is desirable that the roll in its vertical motions should remain parallel, or very nearly so, with the lower roll, not only on account of the operating of the gears, but also that its ends may slide snug and close to the standards without binding against them, as it would if the roll was allowed to tilt up at one end when an article was passed through the rolls nearer to one end than to the other, or which was thicker at one part than at another. To accomplish this I have devised the following method of applying the power of the spring *e* to the roll D: The frame F (which is shown detached in Fig. 3) is formed of two parts, *t u*, the former passing through a slot, *v*, in the latter. The rods *d* pass through eyes *w* in the outer ends of these pieces *t* and *u*, and have nuts *x* on their ends. The other ends, 5, of the pieces *t* and *u* rest on blocks or stirrups *y* attached to the table A. A block, 6, rests on the middle of the frame F, and the spring *c* bears on this block and against the under side of the table. Thus, whichever piece *t* or *u* is raised by the lifting of either end of the roll D, the spring *c* is compressed and is raised off from the other piece, *t* or *u*, and the opposite end of the roll is permitted to follow up and keep parallel.

Advantage is derived in using the wringer arranged as set forth from having the rollers driven separately and independently of each other by the bevel-gears *k* and *n* and *i* and *m*, inasmuch as both rollers work together to grasp the article to be wrung between them and draw it through the space between them without being subjected to anything like abrasion, as would happen if only one of the rollers was driven by gear and the other made to revolve by friction against the clothes.

It has been found in practice that the use of india-rubber that is dark-colored for rollers is injurious to the fabric subjected to their use, these, in many cases, having become indelibly stained by contact with such rollers after they have become softened from being wet. The use of light-colored india-rubber obviates this difficulty by allowing all articles submitted to their action to pass from them without soiling it or mark of any kind.

I am aware that it is not new to operate the rolls of a wringing-machine by gearing; but I know of no previous example of a wringing-machine in which motion is transmitted from one roll to the other by means of bevel cog-wheels; neither am I aware that the rolls of a wringing-machine have hitherto been driven by what is known as a "purchase cog-wheel," which means a cog-wheel fixed upon an independent axis and communicating motion to the cog-wheels which drive the rolls.

I have shown one method whereby the gear-wheels may be applied so as to attain the advantages herein specified; but many modifications may suggest themselves to the skillful mechanic, under which widely different arrangements of the bevel-gear or cog wheels may be applied with equally good results and without departing from the essential principle of my invention.

Having thus described the invention of the said NELSON B. WHITE, the following is what I claim as new therein and desire to secure by Letters Patent:

1. The combination, with the rolls of a wringing-machine, of bevel cog-wheels for transmitting motion from one roll to the other, substantially as described.

2. In a machine for wringing clothes, the bevel-gears *k* and *n*, with *i* and *m*, and shaft *b*, operated by the groove *r*, arranged substantially as described, and driven by any power, in combination with rollers of india-rubber or other suitable material, as set forth.

3. In a wringing-machine, a purchase cog-wheel—that is to say, a cog-wheel of any form mounted upon an independent axis and employed to give motion to the gearing or other devices which rotate the rolls.

WILLIAM B. RHOADS.

Witnesses:

ALEX. A. C. KLAUCKE,
W. F. HALL.